(12) United States Patent
Sherrit et al.

(10) Patent No.: US 9,352,358 B2
(45) Date of Patent: May 31, 2016

(54) MONOLITHIC FLEXURE PRE-STRESSED ULTRASONIC HORNS

(71) Applicant: CALIFORNIA INSTITUTE OF TECHNOLOGY, Pasadena, CA (US)

(72) Inventors: Stewart Sherrit, La Crescenta, CA (US); Xiaoqi Bao, San Gabriel, CA (US); Mircea Badescu, La Canada Flintridge, CA (US); Yoseph Bar-Cohen, Seal Beach, CA (US); Phillip Grant Allen, Walnut, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 0 days.

(21) Appl. No.: 14/590,971

(22) Filed: Jan. 6, 2015

(65) Prior Publication Data

US 2015/0298171 A1 Oct. 22, 2015

Related U.S. Application Data

(62) Division of application No. 13/178,114, filed on Jul. 7, 2011, now Pat. No. 8,958,270.

(60) Provisional application No. 61/362,164, filed on Jul. 7, 2010, provisional application No. 61/505,048, filed on Jul. 6, 2011.

(51) Int. Cl.
*B06B 1/00* (2006.01)
*B06B 1/06* (2006.01)
(Continued)

(52) U.S. Cl.
CPC ... *B06B 1/06* (2013.01); *B06B 3/00* (2013.01); *B23K 20/10* (2013.01); *Y10T 29/49826* (2015.01)

(58) Field of Classification Search
CPC ............ B06B 3/00; B06B 1/06; B23K 20/10; H01L 41/083
See application file for complete search history.

(56) References Cited

U.S. PATENT DOCUMENTS 3,546,498 A 12/1970 McMaster et al.
4,845,687 A 7/1989 Broomfield
(Continued)

FOREIGN PATENT DOCUMENTS

GB 2381691 A 7/2003

OTHER PUBLICATIONS

Newnham et al., Flextensional "Moonie" Actuators, 1993 Ultrasonic Symposium, IEEE pp. 509-513.
(Continued)

*Primary Examiner* — Luke Ratcliffe
*Assistant Examiner* — Hovhannes Baghdasaryan
(74) *Attorney, Agent, or Firm* — Steinfl & Bruno LLP

(57) ABSTRACT

A monolithic ultrasonic horn where the horn, backing, and pre-stress structures are combined in a single monolithic piece is disclosed. Pre-stress is applied by external flexure structures. The provision of the external flexures has numerous advantages including the elimination of the need for a pre-stress bolt. The removal of the pre-stress bolt eliminates potential internal electric discharge points in the actuator. In addition, it reduces the chances of mechanical failure in the actuator stacks that result from the free surface in the hole of conventional ring stacks. In addition, the removal of the stress bolt and the corresponding reduction in the overall number of parts reduces the overall complexity of the resulting ultrasonic horn actuator and simplifies the ease of the design, fabrication and integration of the actuator of the present invention into other structures.

20 Claims, 12 Drawing Sheets

(51) Int. Cl.
*B06B 3/00* (2006.01)
*B23K 20/10* (2006.01)

(56) References Cited

U.S. PATENT DOCUMENTS

| | | | |
|---|---|---|---|
| 5,469,011 A | 11/1995 | Safabakhsh | |
| 5,578,888 A | 11/1996 | Safabakhsh | |
| 5,746,756 A | 5/1998 | Bromfield et al. | |
| 5,903,085 A | 5/1999 | Karam | |
| 6,690,101 B2 | 2/2004 | Magnussen et al. | |
| 6,825,592 B2 | 11/2004 | Magnussen et al. | |
| 6,870,304 B2 | 3/2005 | Magnussen et al. | |
| 6,927,528 B2 | 8/2005 | Barillot et al. | |
| 7,327,637 B2 | 2/2008 | Chambers et al. | |
| 7,368,853 B2 | 5/2008 | Magnussen et al. | |
| 7,754,141 B2 | 7/2010 | Stegelmann | |
| 2004/0006269 A1 | 1/2004 | Novak et al. | |
| 2004/0007387 A1 | 1/2004 | Bar-Cohen et al. | |
| 2004/0047485 A1 | 3/2004 | Sherrit | |
| 2005/0146231 A1 | 7/2005 | Or et al. | |
| 2009/0066192 A1 | 3/2009 | Taki et al. | |
| 2010/0193349 A1 | 8/2010 | Braam | |

OTHER PUBLICATIONS

Fernandez et al., Hollow Piezoelectric Composites, Sensors and Actuators A 51 (1996) pp. 183-192.

Chambers et ai., Characterization of piezoelectrically induced actuation of Ni—Mn—Ga single crystals, Smart Structures and Materials 2005, Proc. SPIE vol. 5761, pp. 478-489.

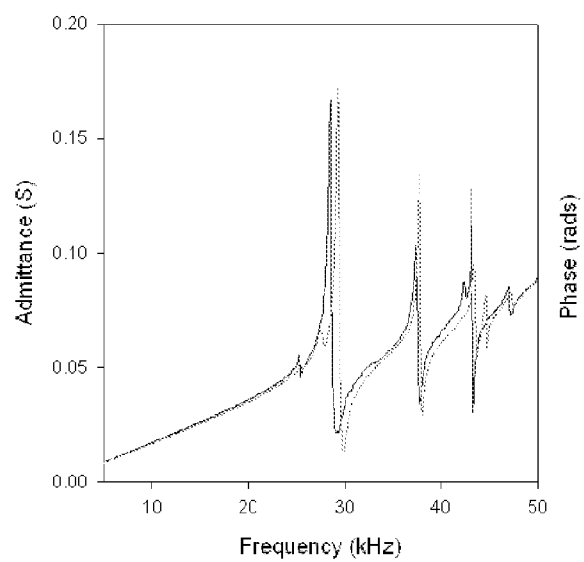 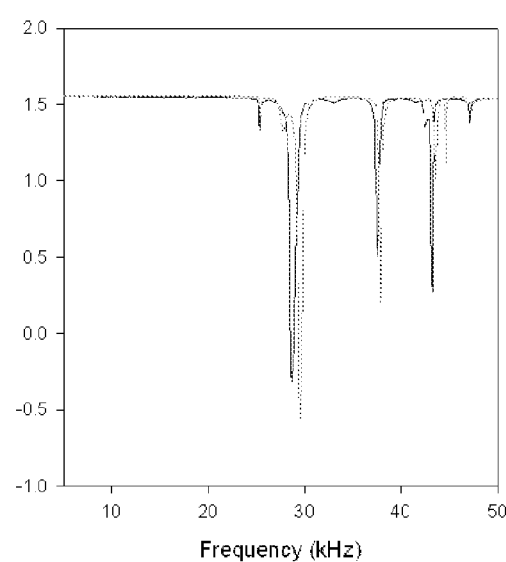
Figure 11A                    Figure 11B

MONOLITHIC FLEXURE PRE-STRESSED ULTRASONIC HORNS

CROSS-REFERENCE TO RELATED APPLICATIONS

This application is a divisional application of U.S. patent application Ser. No. 13/178,114 filed Jul. 7, 2011, now U.S. Pat. No. 8,958,270 issued Feb. 17, 2015, and claims the priority and the benefit thereof, which application in turn claimed the priority and benefit of U.S. provisional patent application Ser. No. 61/362,164 filed Jul. 7, 2010 and the priority and the benefit of U.S. provisional patent application Ser. No. 61/505,048 filed Jul. 6, 2011, each of which applications is incorporated herein by reference in its entirety.

STATEMENT REGARDING FEDERALLY FUNDED RESEARCH OR DEVELOPMENT

The invention described herein was made in the performance of work under a NASA contract, and is subject to the provisions of Public Law 96-517 (35 USC 202) in which the Contractor has elected to retain title.

THE NAMES OF THE PARTIES TO A JOINT RESEARCH AGREEMENT

NOT APPLICABLE

INCORPORATION-BY-REFERENCE OF MATERIAL SUBMITTED ON A COMPACT DISC

NOT APPLICABLE

FIELD OF THE INVENTION

The invention relates to ultrasonic horns in general and particularly to ultrasonic horns that employ pre-stressed actuator elements.

BACKGROUND OF THE INVENTION

A variety of industrial applications exist where power ultrasonic actuators, such as ultrasonic horns, are used to produce large amplitude vibrations. These applications include medical/surgical, automotive, food preparation, and textile cutting applications, as well as use in fabrication industries and material joining Ultrasonic actuators are attractive for their ability to generate precision high strokes, torques and forces while operating under relatively harsh conditions, such as temperatures in the range of single digit Kelvin to 1273 Kelvin. Details related to a variety of applications can be found in the following references: A. Shoh, "Industrial Applications of Ultrasound—A review 1. High Power Ultrasound", IEEE Trans on Sonics and Ultrasonics, SU-22, 2, pp. 60-71, 1975; L. Parrini, "New Methodology For The Design Of Advanced Ultrasonic Transducers For Welding Devices", Proceedings of the IEEE International Ultrasonics Symposium, pp. 699-714, 2000; W. W. Cimino, L. J. Bond, "Physics of Ultrasonic Surgery Using Tissue Fragmentation, Proceedings of the IEEE International Ultrasonics Symposium, pp. 1597-1600, 1995; K. F. Graf, Process Applications of Power Ultrasonics—A Review", Proceedings of the IEEE International Ultrasonics Symposium, pp. 628-641, 1974.

Known in the prior art is Stegelmann, U.S. Pat. No. 7,754, 141, issued Jul. 13, 2010, which is said to disclose in one aspect an ultrasonic horn for transporting ultrasonic energy to an operating location defining a radial direction and an axial direction. The ultrasonic horn includes a horn member and an energy transfer surface disposed on the horn member. The ultrasonic horn also includes an axle member joined to the horn member where the axle member is provided by a first material. The ultrasonic horn further includes an isolation member integrally joined to the axle member and adapted for mounting the ultrasonic horn at a work location where at least a portion of the isolation member is provided by a second material.

Stegelmann further discloses that the first material and the second material can exhibit different properties for transporting ultrasonic energy. In a particular aspect, the axial isolation submember can be acoustically decoupled from the axle member. According to Stegelmann, configuring the isolation member in this manner provides several advantages. For instance, the isolation member will suitably transfer a reduced amount of vibration to the coupler. Accordingly, this can advantageously decrease noise associated with the ultrasonic horn, improve performance due to the lower vibration and improve the mounting of the horn. Moreover, equipment life of both the horn and the coupler can be improved.

As is known in the prior art, the application of pre-stress or preloading can be used to maintain the integrity of the piezoelectric material in an actuator. Known in the prior art is Chambers et al., U.S. Pat. No. 7,327,637, issued Feb. 5, 2008 (herein after referred to as the Chambers et al. '637 patent) and an article entitled "Characterization of piezoelectrically induced actuation of Ni—Mn—Ga singe crystals" by Chambers et al. (Smart Structures and Materials 2005: Active Materials: Behavior and Mechanics, edited by William D. Armstrong, Proceedings of SPIE Vol. 5761 (SPIE, Bellingham, Wash., 2005), pages 478-489) (herein after referred to as the Chambers et al. Induced Actuation article). These references are said to disclose in part the actuation of magnetic materials using stress waves. In particular the Chambers et al. '637 patent discloses an acoustic actuator, including an acoustic stress wave generator and an actuation material operatively positioned relative to the acoustic stress wave generator for the delivery of acoustic stress waves from the generator to actuation material. The application of a pre-stress is shown and discussed with respect to FIG. 6 of the Chambers et al. '637 patent and FIG. 1 of the Chambers et al. Induced Actuation article (herein reproduced as FIG. 1). Also disclosed is that the clamp surrounding the piezoelectric stack (the moonie clamp) holds and positions the stack, without the use of a bonding agent. It also provides a prestress on the stack, which improves its performance. The Moonie clamp can be driven in the transverse direction. In this type of actuator, when the stack expands the work surface contracts and when the stack contracts the work surface expands. In the structures disclosed in the Chambers et al. '637 patent and Induced Actuation article, the clamping function but not the transverse amplification is employed. Additional details regarding the Moonie clamp can be found in the articles entitled "Metal-Ceramic Composite Transducer, the 'Moonie'" by Onitsuka et al. (Journal of Intelligent Material Systems and Structures, July 1995, Vol. 6 No. 4, pages 447-455), "Flextensional 'Moonie' Actuator" by R. E. Newnham et al. (1993 Ultrasonics Symposium, pages 509-513, IEEE, 1051-0117/93/0000-0509), and "Hallow Piezoelectric Composites" by J. F. Fernandez et al. (Sensors and Actuators A, 51, pages 183-192 (1996)).

The structures in the Chambers et al. '637 patent and Induced Actuation article are directed to low power and low frequency applications, principally below 100 Hz, and are well suited for micropositioning applications, as the patent states. If stress levels in addition to those provided by the piezoelectric stack are required, the Chambers et al. '637 patent discloses that a separate acoustic horn can be placed between the piezoelectric material and the actuation material.

In generating stress waves at low frequencies, the devices disclosed in the Chambers et al. '637 patent and Induced Actuation article are not driven at resonance. In fact resonances are described by the Chambers et al. '637 patent and Induced Actuation article as poorly understood unwanted artifacts. When discussing the measured propagated stress wave in the FSMA actuation material resulting from the control voltage pulse plotted in FIG. 7A of the Chambers et al. '637 patent, the patent discloses that it is found that this stress wave is not ideal, reaching nearly the same tensile stress as compressive stress. The oscillations along the peak of the stress wave are disclosed to be due to the length of the input control pulse relative to the period of the resonance of the piezoelectric stack. The Chambers et al. '637 patent indicates that a sound wave can travel from one end of the stack to the other approximately 7 times in 50 μs, based on the speed of sound calculated from stack properties, resulting in the 7 small peaks seen along the major peak of the wave. In discussing the effect of repetition rate on peak-to-peak output stress on a full actuation cycle, the Chambers et al. Induced Actuation article states that the data shows a peak at 70 Hz, along with several other local minima and maxima. They disclose that they believe these features are associated with acoustic resonances in the actuator itself, or the spring load system. However, they state that the details of the resonances are not understood well.

Pre-stressing the material becomes especially beneficial when the piezoelectric material is driven at high power. Barillot et al, U.S. Pat. No. 6,927,528, issued Aug. 9, 2005, is said to disclose in part the damping capacities of a piezoelectric actuator and its resistance to dynamic external stresses. One embodiment shown in Figure. 7 in Barillot, herein reproduced as FIG. 2, discloses that to increase the capacity of the actuator to resist higher external stresses, the preloading of the piezoelectric components can also be increased. It is further disclosed that this preloading is normally performed by the actuator shell 31, but its value is limited in practice by the elastic limit of the material of the shell 31. Barillot further states that it may therefore be advantageous to add an additional preloading device 35 arranged in parallel to the large axis 16 of the actuator so as to increase the capacity of the actuator to resist external stresses. To use such a system, the use of an extruded shell 31 is indicated as being particularly useful. Barillot states that two springs can be connected to the shell 31 along its large axis to increase the preloading on the piezoactive components.

Another approach also known in the prior art to pre-stressing piezoelectric material in high power ultrasonic actuators is the use of a stress bolt as shown in FIG. 3A. Typically these actuators are assembled with a horn, piezoelectric rings, backing and a stress bolt. The ring elements are connected electrically in parallel and placed between the horn and the backing ring. The pre-stress bolt is inserted through a backing ring and the piezoelectric rings and screwed into the horn until a desired pre-stress level, such as greater than 20 MPa, is reached. Another example of pre-stressing using a bolt is disclosed in the international application identified by the World International Patent Organization International Publication Number WO 03/026810 A1, which example is reproduced as FIG. 3B. This document discloses in part that a piezoelectric element 1 comprising two piezoelectric ceramic rings and thin electrodes is held in compression by a pre-load between a steel rear mass 2 and the horn 3. The pre-load is provided by a pultruded glass fibre tube 4 under compression in a sliding fit with a high-tensile cap-head bolt 5. A washer 6 is inserted between the head of the bolt and the rear face of the pultruded tube. The cap head bolt is screwed into the transducer horn adjacent to the piezoelectric ceramic at 7, securing the arrangement. Tightening the cap-head bolt 5 forces the pultruded tube 4 to remain under compression. The washer 6 ensures that the torsional force on the tube and consequently on the piezoelectric ceramic is kept to a minimum. Also known in the prior are is the use of an insulating bolt to address the issue of internal electrical discharge or to eliminate the need for an insulating covering over a traditional metallic bolt. For example the insulating bolt can be made of E glass which has a compliance that is twice that of steel and nearly as strong.

A number of problems in ultrasonic horns that are constructed with a pre-stress bolt have been observed. One of these problems is that ultrasonic horns with pre-stress bolts are susceptible to electrical discharge and mechanical failure. In addition typically ultrasonic horns include numerous components. A high component count leads to the result that their design, manufacture, assembly and integration into other structures can be complicated and costly. It can also be expensive and time consuming to make an actuator element having a hole defined therein that is designed to allow the pre-stress bolt to pass through. The hole defined in an actuator element can also be a "stress raiser" which can lead to mechanical failure of the actuator.

There is a need for an ultrasonic horn that addresses the issues of fabrication and assembly complexity and as well as performance failure issues.

SUMMARY OF THE INVENTION

According to one aspect, the invention features an ultrasonic horn for a high power actuator. The ultrasonic horn comprises a monolithic pre-stress portion constructed from a first material, the monolithic pre-stress portion having a first interior surface and a second interior surface defined therein, the first interior surface and the second interior surface configured to provide a pre-stress cavity for a high power actuator material; and a horn portion connected to the monolithic pre-stress portion, the horn portion is configured to be driven at a resonance frequency.

In one embodiment, the first interior surface and the second interior surface are monolithically connected by at least one flexure structure. In another embodiment the at least one flexure structure is configured to apply a specified pre-stress having a pre-stress value to an actuator material inserted in the pre-stress cavity. In an additional embodiment, the pre-stress value varies less than one part in a hundred as a temperature varies over 100 degrees Celsius. In a further embodiment, the at least one flexure has a first stiffness value and the actuator material has a second stiffness value, the first stiffness value being at least a factor of 10 less than the second stiffness value. In yet another embodiment, a ratio between the first stiffness value and the second stiffness value is configured to reduce a mechanical creep. In yet an additional embodiment, a ratio between the first stiffness value and the second stiffness value is configured to increase a coupling value. In another embodiment, the pre-stress value varies less than one part in 20 as the first material deforms by one part in 20. In still another embodiment, the specified pre-stress is directed along a first axis and the horn portion amplifies displacement along the first axis. In another embodiment, the actuator material is a piezoelectric material. In still an additional embodiment, the actuator material has a set of exterior dimensions and lacks a through hole. In still a further embodiment, the first material comprises titanium. In yet still another embodiment, the resonance frequency is at least five thousand Hertz. In yet still an additional embodiment, the ultrasonic horn actuator is driven by a power of at least 20 Watts. In yet still a further embodiment, the ultrasonic horn actuator is provided as a component in a medical device. In another embodiment, the ultrasonic horn actuator is attached to a support structure at a node of a resonant mode of the resonant frequency.

According to another aspect, the invention relates to a method of manufacturing an ultrasonic horn for a high power actuator. The method comprises the step of forming a monolithic pre-stress portion constructed from a first material, the monolithic pre-stress portion having a first interior surface and a second interior surface defined therein, the first interior surface and the second interior surface connected by at least one flexure, the first interior surface, the second interior surface and the at least one flexure configured to provide a pre-stress cavity for a high power actuator material; and forming a horn portion connected to the monolithic pre-stress portion, the horn portion configured to be driven at a resonance frequency.

In another embodiment, the step of forming a monolithic pre-stress portion comprises forming the monolithic pre-stress portion using electron beam melting. In an additional embodiment, the step of forming a monolithic pre-stress portion comprises forming the monolithic pre-stress portion using rapid prototyping. In a further embodiment, the step of forming a monolithic pre-stress portion comprises forming the monolithic pre-stress portion by precision machining.

The foregoing and other objects, aspects, features, and advantages of the invention will become more apparent from the following description and from the claims.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

FIG. 11A shows the admittance spectra for one embodiment of the invention;

FIG. 11B shows the phase spectrum for one embodiment of the invention;

DETAILED DESCRIPTION

Figure 1:
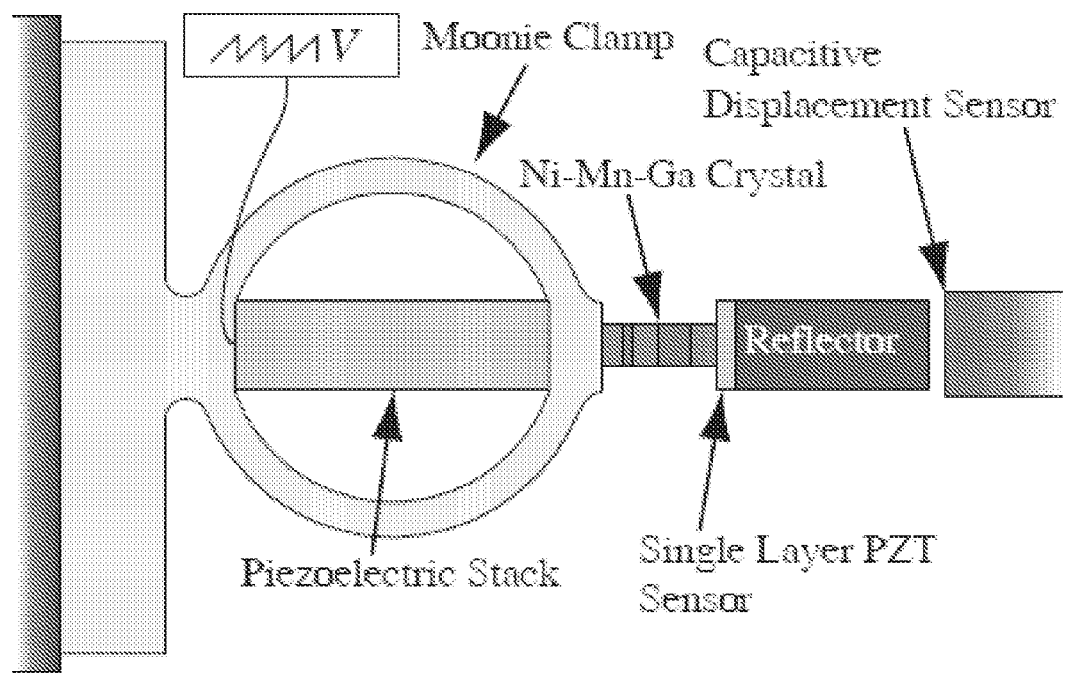
FIG. 1 is a drawing of a clamp used to apply pre-stress as known in the prior art.
Figure 2:
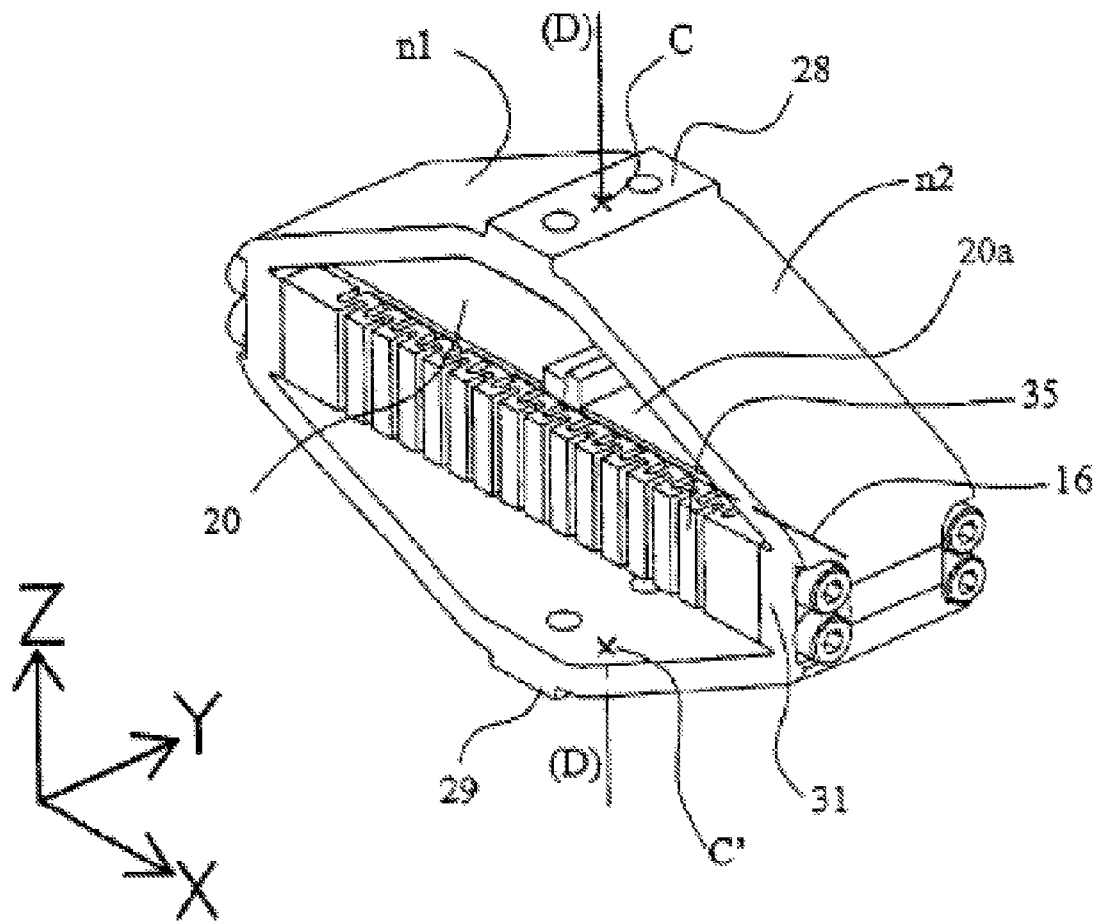
FIG. 2 is a drawing of a device used to apply pre-stress as known in the prior art.
Figure 3A:
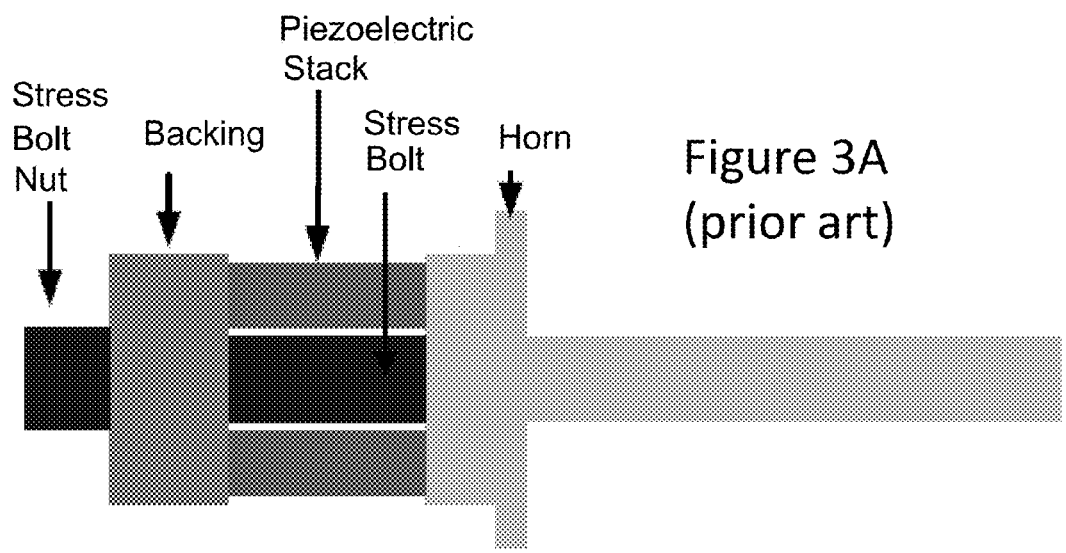
FIG. 3A and FIG. 3B are drawings of devices known in the prior art that are used to apply pre-stress using stress bolts.
Figure 3B:
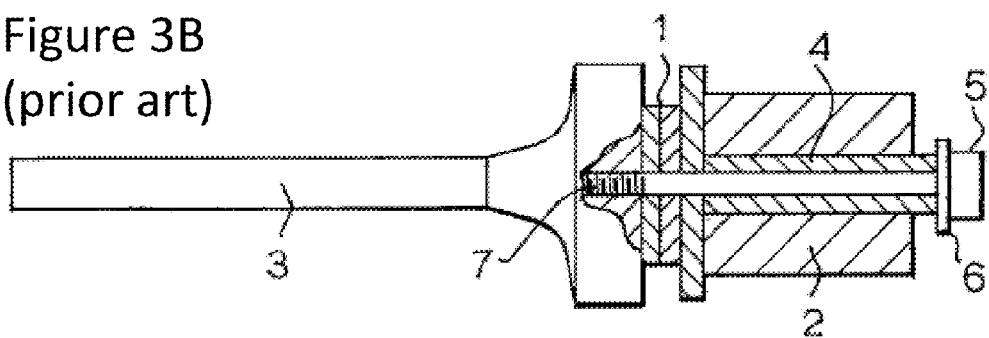

One embodiment of the present invention describes a monolithic ultrasonic horn where the horn, backing, and pre-stress structures are combined in a single monolithic piece. According to one embodiment of the invention, pre-stress is applied by external flexure structures. These flexures are designed to produce the appropriate stress when assembled with an actuation material, such as a piezoelectric material or an electrostrictive material.

The provision of the external flexures has numerous advantages including the elimination of the need for a pre-stress bolt. The elimination of the pre-stress bolt eliminates potential internal electric discharge points in the actuator. In addition, it reduces the chances of mechanical failures in the actuator material that result from the free surface in the hole of conventional ring stacks. In addition the elimination of the stress bolt and the corresponding reduction in the overall number of parts reduces the overall complexity of the resulting ultrasonic horn actuator and simplifies the ease of the design, fabrication and integration of an actuator into other structures.

Another advantage of this embodiment is that the actuator volume is not reduced to accommodate the stress bolt. This allows for an increase in the total energy density. In addition, the pre-stress is not limited by bolt diameter. Further, production of piezoelectric plates without a hole has a higher yield and is thus less expensive. Also, by reducing the stiffness and increasing the displacement of the external flexure one can increase the electromechanical coupling of the actuator. An additional benefit is the increased thermal preload and mechanical creep stability due to the increase by about an order of magnitude or more of the compliance of the spring system. According to one embodiment of the invention, the actuator material is at least a factor of ten times stiffer than the flexure structure. According to another embodiment, the pre-stress value varies less than one part in 20 as the monolithic pre-stressed actuator material deforms by one part in 20. According to another embodiment, the pre-stress value varies less than one part in a hundred as the temperature varies over one hundred degrees Celsius. Traditional systems that use pre-stress bolts that have a higher stiffness are more prone to variations in pre-stress due to temperature variation and mechanical creep. It is also noted that at high pre-stress and high frequency one does not have to resort to exotic alloys to accommodate the stress and fatigue in the stress bolt.

According to the principles of the present invention, the use of flexures and rapid prototyping can effectively be applied to the manufacture of power ultrasonic horns. The invention contemplates manufacturing the monolithic ultrasonic pre-stress horn actuators from a single material or plate, in an array in a plate, or in a 3D structure. The invention also enables the integration of high power horns into 2D or 3D structures. In one embodiment of the present invention, fabrication of the horns was achieved with electron beam melting (EBM). In other embodiments, other rapid prototyping techniques in addition to precision machining are employed. In additional embodiments, fabrication is achieved using such low cost high production techniques as investment casting. The approach of the present invention in using flexures can also be scaled to miniaturized horns for other specialized applications like camera motors and miniature zoom lenses. Precision machining can be employed to produce an ultrasonic horn having precisely controlled dimensions from a rapidly produced monolithic pre-form.

Depending on the application, as known to one of skill in the art, ultrasonic horns can be produced in a variety of configurations including constant, linear, exponential and stepped cross sections. These names refer to the degree in which the area changes along the length of the horn from the base to the tip. A magnification in the strain occurs in the stepped horn that in general is a function of the ratio of diameters. In addition, the device is generally driven at resonance to further amplify the strain. The resonance amplification is determined by the mechanical Q (attenuation) of the horn material and radiation damping. The horn length primarily determines the resonance frequency. For example for a 22 kHz resonance frequency, a stepped horn of titanium has a length of approximately 8 cm. Other more complicated horn structures are described in the following references: U.S. Pat. No. 6,863,136 entitled "Smart-ultrasonic/sonic driller/corer" issued Mar. 8, 2005 to Yoseph Bar-Cohen, Stewart Sherrit, Benjamin Dolgin, Thomas Peterson, Dharmendra Pal, Jason Kroh, and Ron Krahe; S. Sherrit, M. Badescu, X. Bao, Y. Bar-Cohen, and Z. Chang, "Novel Horns for Power Ultrasonics," Proceedings of the IEEE International Ultrasonics Symposium, UFFC, Montreal, Canada, Aug. 24-27, 2004; S. Sherrit, B. P. Dolgin, Y. Bar-Cohen, D. Pal, J. Kroh, T. Peterson "Modeling of Horns for Sonic/Ultrasonic Applications", Proceedings of the IEEE Ultrasonics Symposium, pp. 647-651, Lake Tahoe, October 1999; S. Sherrit, S. A. Askins, M. Gradziol, B. P. Dolgin, X. Bao, Z. Chang, and Y. Bar-Cohen, "Novel Horn Designs for Ultrasonic/Sonic Cleaning Welding, Soldering, Cutting and Drilling," Paper 4701-34, Proceedings of the SPIE Smart Structures and Materials Symposium, San Diego, Calif., Mar. 17-19, 2002; and X. Bao, Y. Bar-Cohen, Z. Chang, B. P. Dolgin, S. Sherrit, D. S. Pal, S. Du, and T. Peterson, "Modeling and Computer Simulation of Ultrasonic/Sonic Driller/Corer (USDC)", IEEE Transactions on Ultrasonics, Ferroelectrics, and Frequency Control, vol. 50, no. 9, pp. 1147-1160, September 2003.

According to one embodiment of the invention, the appropriate flexure geometry for one particular configuration was determined by modeling the monolithic horn by finite element analysis using SolidWorks (available from Dassault Systemes SolidWorks Corp., 300 Baker Avenue, Concord, Mass. 01742) and COSMOS analysis software (available from Dassault Systemes SolidWorks Corp., 300 Baker Avenue, Concord, Mass. 01742).

Figure 4:
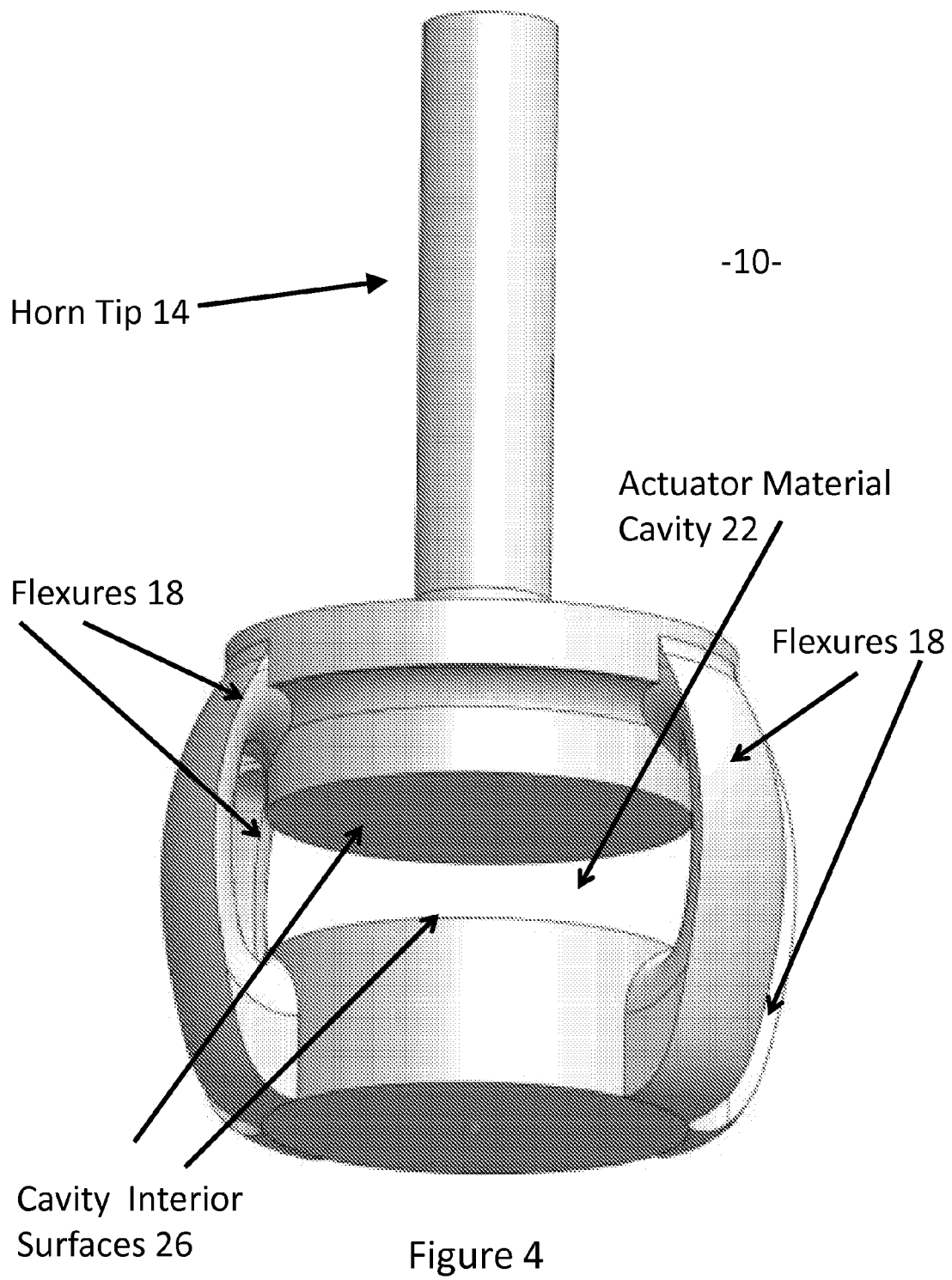
FIG. 4 illustrates an exemplary embodiment of a monolithic pre-stress horn actuator according to the invention.
Figure 5:
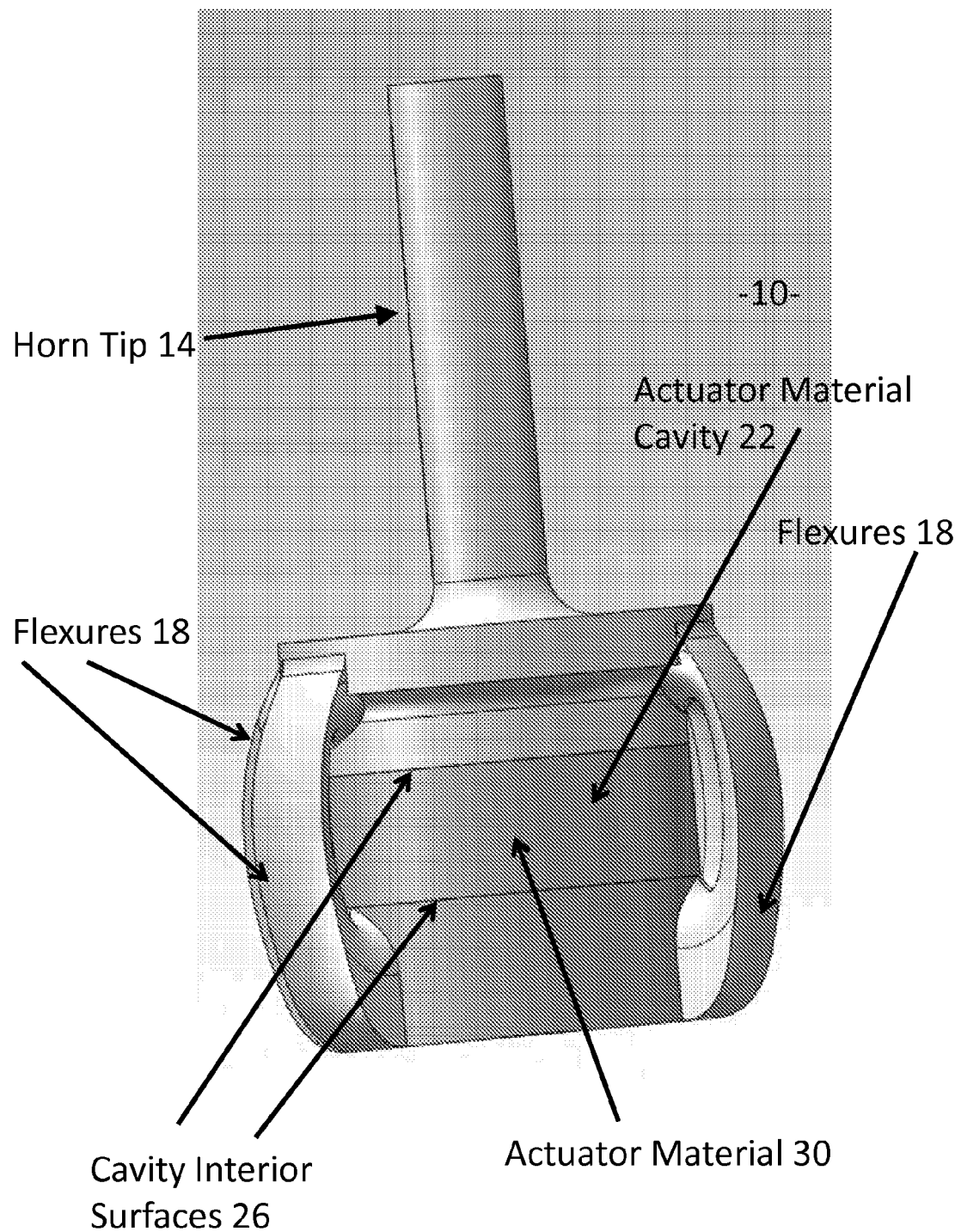
FIG. 5 illustrates an exemplary embodiment of a monolithic pre-stress horn actuator including an actuator material according to the invention.
Figure 6:
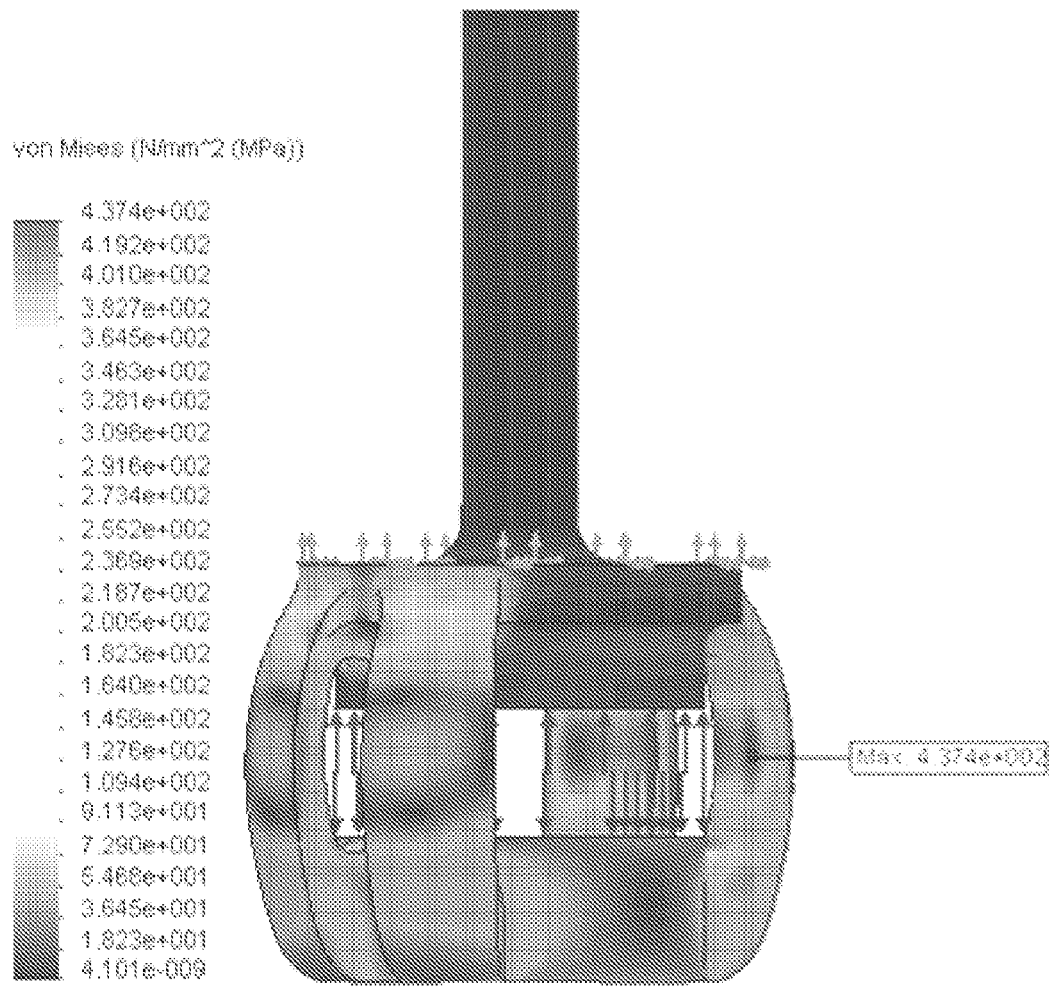
FIG. 6 is a plot of a static Von Mises stress profile for a given gap separation for one embodiment of the invention.

A solid model of an embodiment of a monolithic pre-stress horn actuator 10 having these flexures is shown in FIG. 4. The monolithic pre-stress horn actuator 10 has a horn tip 14, flexures 18, an actuator material cavity 22 defined by cavity interior surfaces 26. In one embodiment, the monolithic pre-stress horn actuator 10 is held at a nodal plane that is designed to be between the flexures 18 and the horn tip 14. According to this embodiment, affixing the monolithic pre-stress horn actuator 10 at a nodal plane reduces the energy from the resonant mode that is lost to a holding or support structure. In FIG. 5 is shown a horn with flexures including an actuator material 30, such as a piezoelectric stack, inserted in the cavity 22 that is formed by the interior surfaces 26 of the two portions of the horn that are joined by the flexures 18. A static Von Mises stress profile for a given gap separation for this embodiment is shown in FIG. 6. The stresses shown in FIG. 6 are principally larger within the flexures.

In order to design a flexure which acts like a spring by remaining in the material's elastic region, the flexure was designed in one embodiment to operate at stresses lower than the material's yield strength. According to one embodiment, to ensure that a piezoelectric transducer (PZT) never experienced tensile stress under maximal drive voltages, the piezoelectric horn was design to achieve a compressive pressure of 20 MPa on the inner surfaces of the piezoelectric material cavity. This is the compressive pressure that would be exerted on a PZT transducer inserted in the cavity. In one embodiment, a 25.4 mm diameter PZT cylinder had an area of 5.1 cm$^2$. In order to experience 20 MPa of stress, the PZT required a compressive force of 10.1 kN. In a current preferred embodiment, the pre-stress is exerted along the central symmetry axis of the monolithic pre-stress horn actuator. In one embodiment, the displacement amplification of the horn actuator is along the same central symmetry axis.

The stress calculations determined that the deformation of the PZT actuator was negligible since the ceramic material has a high stiffness compared to the flexure. The SolidWorks design was modeled and tested in COSMOS and the results were compared with IDEAS values, IDEAS is a finite element analysis software. I-DEAS (Integrated Design Engineering Analysis Software) was developed by UGS, which was acquired by Siemens PLM software having an office at 5800 Granite Parkway, Suite 600, Plano, Tex. 75024. After choosing the manufacturing technique and material, it was possible to determine the proper dimensions of the flexure and its gap to allow for a 20 MPa pre-stress when the flexure was pulled to produce a 0.13 mm increase in distance from the nominal separation of the 9.2 mm gap in order to accommodate the 9.33 mm PZT stack thickness. The titanium flexure could be opened and the PZT placed in position with a factor of safety of approximately 1.89. The highest stress occurred on the inside of the flexure at the inside edges. This surface was thickened and given a large fillet to reduce the stress concentration. Another consideration was the risk of fatigue failure, since the actuator is operating at 30 kHz enduring thousands of cycles each second. In one embodiment the material contemplated is Ti-6Al-4V. The principles of the invention are not limited to a particular material and the various embodiments contemplate the use of the materials including but not limited to aluminum, steel, titanium and any other alloy material that can be casted. In one embodiment, multiple materials such as different alloys are used in different parts of the structure to, for example, provide for different stiffness values such as a softer stiffness value for the flexures.

Figure 7:
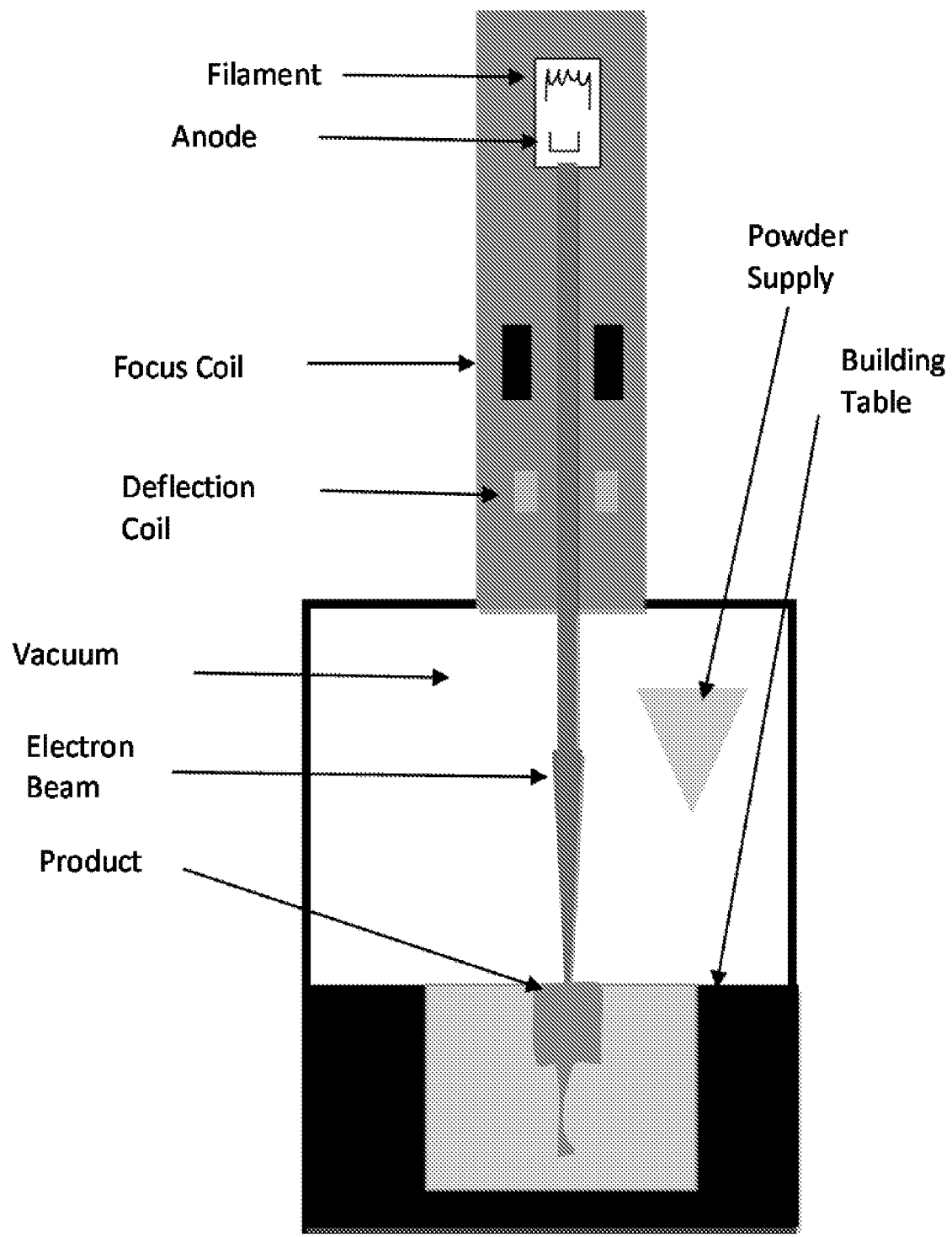
FIG. 7 shows an illustrative schematic of the EBM manufacturing process used in one embodiment to manufacture a monolithic pre-stress horn actuator according to the invention.

In order to investigate rapid prototyping in the manufacture of horns according to one embodiment of the invention, the monolithic horns were manufactured in Ti-6Al-4V using electron beam melting/manufacturing (EBM). A schematic of the EBM manufacturing process is shown in FIG. 7. In the EBM process, fully dense metal parts are built up layer-by-layer by melting metal powder using a powerful electron beam. Each layer is melted to substantially the geometry defined by a 3D CAD model. The EBM technology allows for high energy to be used providing high melting capacity and high productivity. Parts are built in vacuum at elevated temperatures resulting in stress-relieved parts with material properties better than cast and comparable to wrought material. Referring to FIG. 7, the EBM process starts with electrons being emitted from a filament which is heated to greater than 2500° C. The electrons are accelerated through the anode to half the speed of light. A magnetic field lens brings the beam into focus. Another magnetic field controls the movement of the beam. When the electrons hit the powder, kinetic energy is transformed to heat. The heat melts the metal powder. For each layer of powder, the electron beam first scans the powder bed to maintain a certain elevated temperature, specific for each of different alloys. Thereafter the electron beam melts the contours of the part and finally the bulk. Two companies involved in EBM production are CalRAM Inc. having a place of business at 2380 Shasta Way, Suite B, Simi Valley, Calif. 93065 USA and Arcam AB having a place of business at Krokslätts Fabriker 27A, SE-431 37, Mölndal, Sweden. Additional details regarding the EBM process can be found in materials located on the internet pages maintained by these companies.

In the EBM process the titanium parts can be made to an accuracy of about 0.4 mm with strengths comparable to cast and wrought materials. The part quality is such that they are now used in both the aerospace and medical implant fields. The EBM manufacturing approach is useful for small production runs. According to one embodiment for larger production and cheaper cost per part, use of the investment casting tree approach is contemplated as part of the invention. In this approach it is also possible to co-cast, for example, stainless steel and titanium.

Figure 8A:
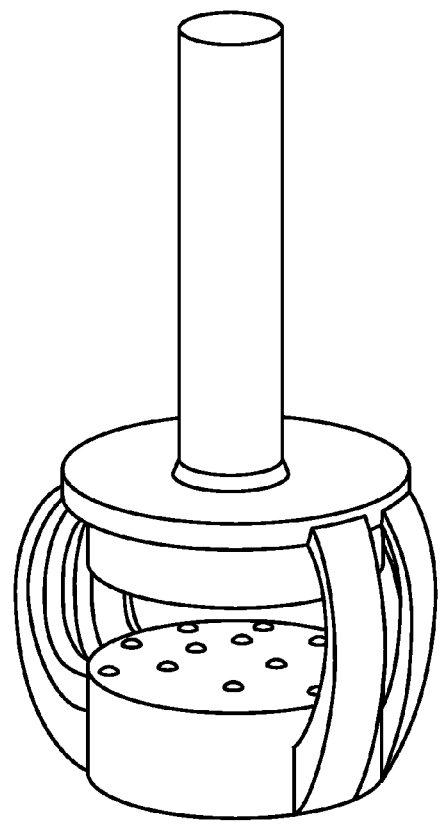
FIG. 8A shows an image of a rapid prototype and EBM manufactured Titanium ultrasonic pre-stress horn actuator according to the invention.
Figure 8B:
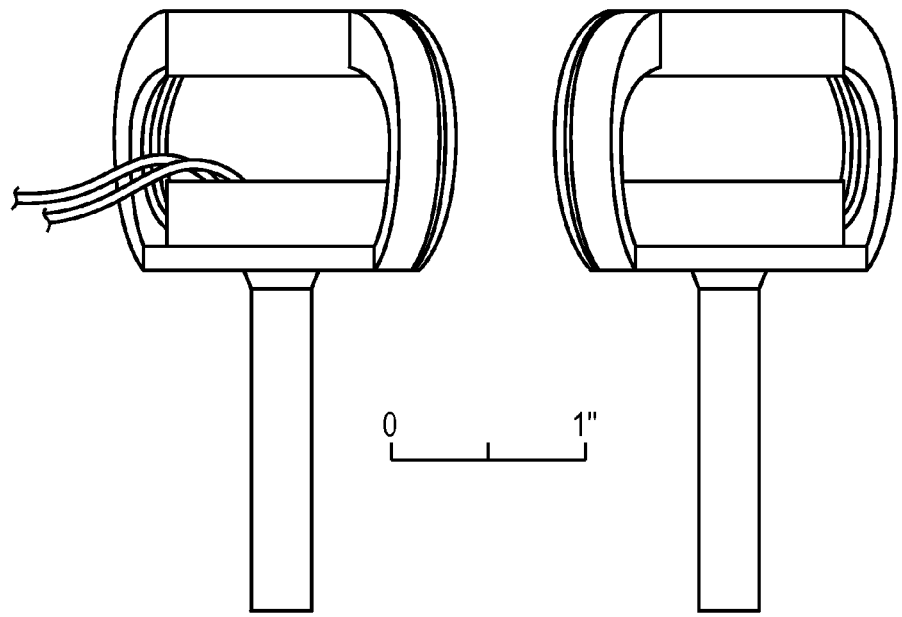
FIG. 8B shows two assembled titanium alloy (Ti-6Al-4V) ultrasonic horn prototypes manufactured using EBM with piezoelectric stacks inserted according to the invention.

FIG. 8A shows an image of a rapid prototype and EBM manufactured titanium alloy ultrasonic pre-stress horn actuator. A final milling finished the surfaces that contact the piezoelectric stack. FIG. 8B shows two assembled titanium alloy (Ti-6Al-4V) ultrasonic horn prototypes manufactured using EBM with piezoelectric stacks. The EBM manufactured horn critical surfaces were finished using a standard mill and lathe. The United States quarter dollar coin provides a reference scale.

Figure 9:
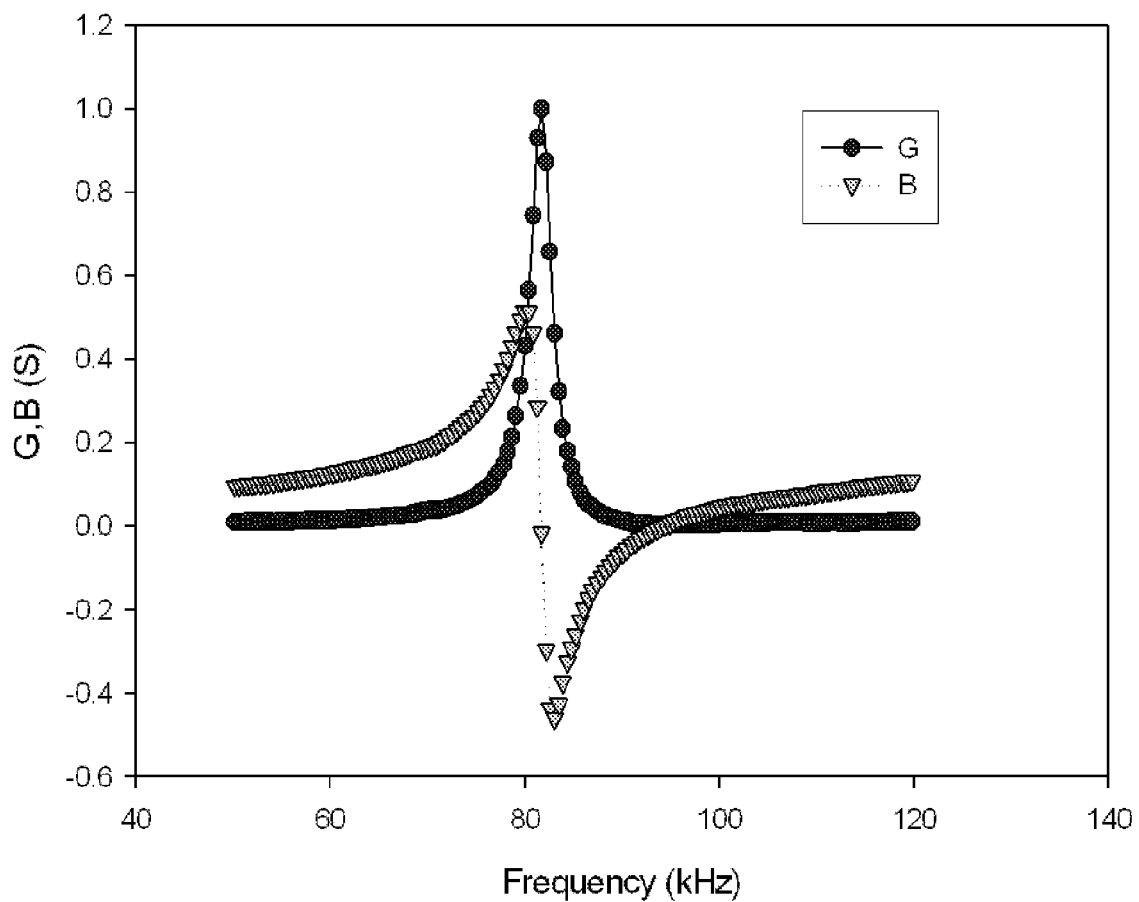
FIG. 9 shows the impedance spectrum for one embodiment of the invention.

According to one embodiment, the piezoelectric stacks were purchased from Piezomechanik Gmbh. In this embodiment, the bi-polar stacks were nominally 25.4 mm OD and 9.33 mm thick. The impedance spectrum of the first length extensional mode for these stacks is shown in FIG. 9. The impedance spectra of the assembled horns shown in FIG. 8B were measured on a HP 4294a Impedance analyzer. An analysis of the small signal resonance data of the bare stack gave an effective piezoelectric constant of 480 pC/N for the material and a capacitance of 261 nF. The coupling was determined to be $k_{33}$=0.56 and the elastic compliance at constant field in the 33 direction was 5.4×10-11 m²/N. The mechanical Q was in the 40-80 range. Those skilled in the art will recognize that piezoelectric material from another source and having other dimensions can be used without departing from the inventive concepts disclosed herein.

Figure 10:
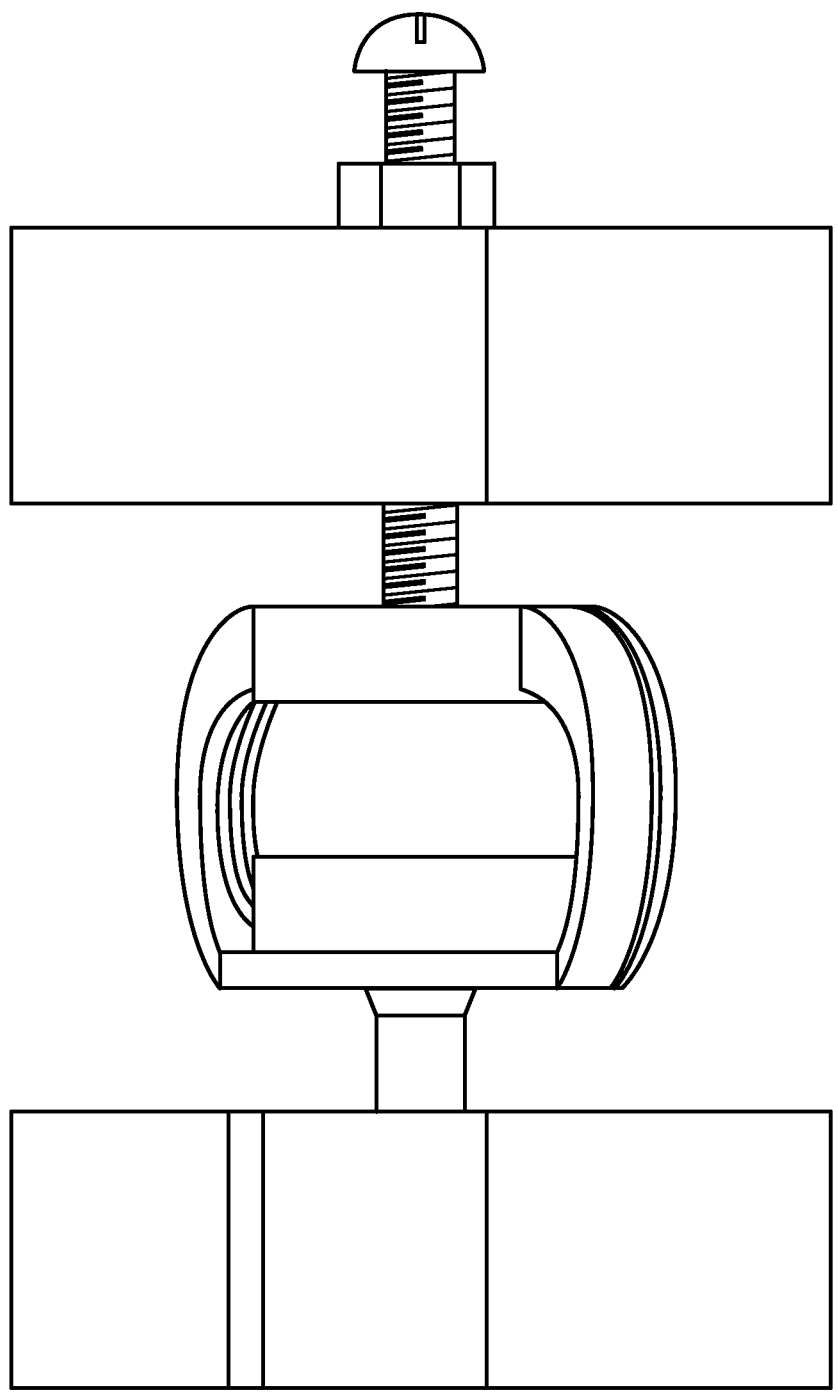
FIG. 10 shows a portion of a support rig that was used to assemble one of the embodiments according to the invention.

In order to open the flexure to install the stack, a support structure was designed to move the flexures so as to pull the first interior surface and the second interior surface apart sufficiently to allow for a piezoelectric stack coated with 3M 2216 epoxy to be inserted. Part of the support rig that was used to open the flexures is shown in FIG. 10. The horn tip is clamped between compression plates in a vice. The other end of the ultrasonic pre-stress horn has a blind threaded hole provided therein. A bolt is used to pull the threaded end of the ultrasonic pre-stress horn away from the horn base. An aluminum block is fixed to the vice surface to support the other end of the bolt. When the flexures were released, the voltage on a 10 microfarad capacitor connected in parallel with the piezoelectric stack was monitored to provide a value for the applied pre-stress. Upon releasing the flexure, the charge generated on the piezoelectric actuator indicated a pre-stress greater than 25 MPa. In one embodiment, if the pre-stress is less than a target value, then shims can be inserted to raise the pre-stress level to the target value when the actuator material is inserted in the pre-stress cavity. The necessary thickness of the shims can be calculated or can be determined by testing, based on a measurement of the parallel capacitor. In another embodiment, if the pre-stress level of the monolithic pre-stress ultrasonic horn is greater than a target value, some additional material can be removed from one or more of the interior surfaces of the pre-stress actuator material cavity so as to achieve the target pre-stress level. The target pre-stress levels will vary depending on the application for the monolithic pre-stress ultrasonic horn and on the actuator material used.

The admittance spectra of the assembled horns shown in FIG. 8B are shown in FIG. 11A and the phase spectra are shown in FIG. 11B. From this data, the frequencies were found to be 28.5-29.3 kHz and the coupling was measured to be in the range k=0.20-0.21, which is an improvement over a standard horn with the same dimensions with internal stress-bolt. Modeling of horns with more compliant springs predict coupling of k=0.3 and higher. This is significantly better than similar horns produced with a stress bolt. The mechanical Q's of the horn were measured to be 106 and 115 which is larger than the Q of the bare piezoelectric stacks (Q≈40-80). These results for the flexure stack horns suggest that embodiments of high power ultrasonic horns can be produced that have coupling coefficients that are equal to or greater than standard horns manufactured with a stress bolt. In addition these horn structures have the advantage that the piezoelectric volume for a given length can be increased. Also, the removal of the stress bolt removes a potential discharge point internal to the piezoelectric and removes a free surface for cracks to initiate on. In other embodiments, the resonant frequency of the monolithic pre-stress ultrasonic horn can be in the range of 5 kHz to 200 kHz. In other various embodiments, the power levels applied to a high power horn actuator of the present invention are up to hundreds of Watts. In some embodiments, the principles of the invention are applied to low power applications such as camera motors and miniature zoom lenses and the like. In these embodiments the power levels can be in the milliwatt or lower range. Additional low power embodiments include a wide variety of applications in which a mechanism capable of generating very small oscillations is required.

The ultrasonic pre-stress monolithic horns of one embodiment of the invention shown in FIG. 8B were generated using the EBM process. However, if large quantities were required, the ultrasonic pre-stress monolithic horns of the present invention could also be manufactured using such production run techniques as investment casting, water-jetting, and EDM. In addition one could also include sacrificial features like a larger diameter horn tip or a threaded hole in the backing to aid in the assembly.

The use of flexures as opposed to stress bolts to generate the pre-stressing provides additional advantages of the present invention. Some of these advantages are related to the flexures having a lower spring constant than a stress bolt. One benefit of this is thermal preload stability in which operation over a larger temperature range, up to the Curie Temperature of the piezoelectric material that is used, is enabled. In addition by reducing the spring constant and increasing the displacement, less energy is required in the spring material at resonance and there is less potential for dynamic stress which induces fatigue. In the "Modeling of Horns for Sonic/Ultrasonic Applications" paper cited above, it was determined that a stepped horn with a stress bolt had a coupling of k=0.18. A re-analysis of the same data indicated that if the stress bolt in the model was removed, the coupling was found to increase to k=0.34. The replacement of the stress bolt with the flexures, therefore, corresponds to a replacement by a very soft spring with a stiffness of an order of magnitude or more smaller. The softer spring improves the coupling.

Figure 12A:
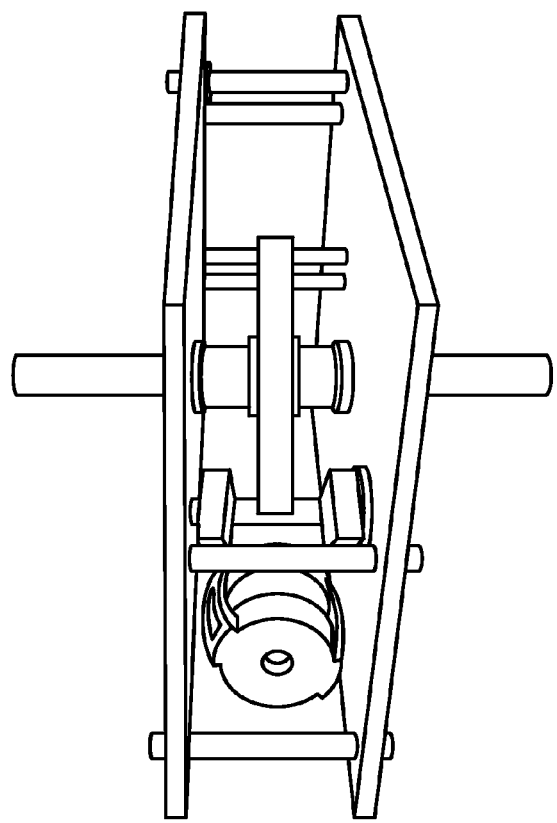
FIG. 12A is an image of a device according to the principles of the invention with a testing apparatus.
Figure 12B:
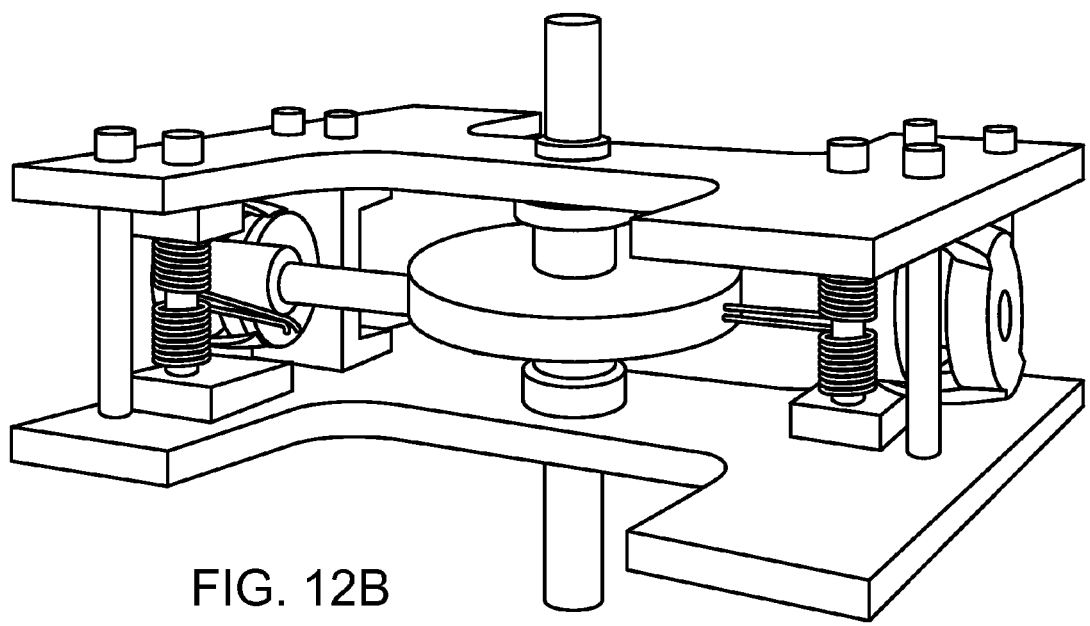
FIG. 12B is a CAD rendering of an illustrative example of a Barth motor implemented according to the principles of the invention.

FIG. 12A and FIG. 12B show one of the many applications for an ultrasonic horn of the present invention. In the embodiments shown in FIG. 12A and FIG. 12B, the monolithic pre-stress ultrasonic horns were designed to be implemented in a Barth motor. FIG. 12A is an image of the device with a testing apparatus. FIG. 12B is a CAD rendering of an illustrative example of a Barth motor produced by mounting a flexure ultrasonic horn of the present invention against a rotor. Testing of the motor with a horn of the present invention demonstrated a rotor speed of 15 RPM and a torque of approximately 0.3 N-m. The torque was determined by hanging a mass around the shaft, then measuring the constant rate at which the mass was lifted against gravity.

Additional disclosure related to flexure ultrasonic horns can be found in Monolithic Rapid Prototype Flexured Ultrasonic Horns by S. Sherrit, X. Bao, M. Badescu, Y. Bar-Cohen, and P. Allen published in IEEE International Ultrasonics Symposium, San Diego, October 2010.

Other applications for the use of a monolithic pre-stress horn actuator of the present invention include but are not limited to structurally integrated motors, ultrasonic drilling including rotary hammering drills driven by a single piezoelectric stack, ultrasonic rock crushing, ultrasonic levitation, ultrasonic driller/corer (USDC), industrial applications such as cutting and welding, medical applications including surgical tools, lithotripsy, knifes, and drills, space applications including corers, drills, abrasion tools and powder samplers, and testing equipment such as wearing testing and fatigue testing.

While several of the embodiments of the invention mentioned above discussed the use of piezoelectric material, the invention also contemplates the use of other actuation material. These materials include but are not limited to electrostrictive materials, magnetorestrictive materials, and thermal and ferromagnetic shape memory alloys.

In piezoelectric materials, the strain S is proportional to electric field E, $S=d \cdot E$ where d is the piezoelectric constant. In electrostrictive materials, the strain S is proportional to $E^2$. Electrostriction applies to all crystal symmetries, while the piezoelectric effect only applies to the 20 piezoelectric point groups. In addition, unlike piezoelectricity, electrostriction cannot be reversed; that is, deformation will not induce an electric field. Electrostrictive materials can be driven like a tuned piezoelectric. If $S=Q \cdot E^2$ then by applying a bias field E and an ac field dE, a tuned piezoelectric can be achieved, with $dS=(2 \cdot Q \cdot E) dE$. Many piezoelectric and electrostrictive materials are ceramic (PZT, PZN-PT). Ceramics generally exhibit tensile strength that is a fraction of their compressive strength. If driven at high fields and at high power (high fields and high frequency), they may go in tension and display reduced life due to crack generation if the material is not preloaded. As discussed above by applying a DC compressive preload, the power that may be applied to the actuator without fear of destruction is increased.

DEFINITIONS

Unless otherwise explicitly recited herein, any reference to an electronic signal or an electromagnetic signal (or their equivalents) is to be understood as referring to a non-volatile electronic signal or a non-volatile electromagnetic signal.

THEORETICAL DISCUSSION

Although the theoretical description given herein is thought to be correct, the operation of the devices described and claimed herein does not depend upon the accuracy or validity of the theoretical description. That is, later theoretical developments that may explain the observed results on a basis different from the theory presented herein will not detract from the inventions described herein.

Any patent, patent application, or publication identified in the specification is hereby incorporated by reference herein in its entirety. Any material, or portion thereof, that is said to be incorporated by reference herein, but which conflicts with existing definitions, statements, or other disclosure material explicitly set forth herein is only incorporated to the extent that no conflict arises between that incorporated material and the present disclosure material. In the event of a conflict, the conflict is to be resolved in favor of the present disclosure as the preferred disclosure.

While the present invention has been particularly shown and described with reference to the preferred mode as illustrated in the drawing, it will be understood by one skilled in the art that various changes in detail may be affected therein without departing from the spirit and scope of the invention as defined by the claims.

What is claimed is:

1. A method of manufacturing an ultrasonic horn for a high power actuator, comprising the steps of:
   forming a monolithic pre-stress portion constructed from a first material, said monolithic pre-stress portion having a first interior surface and a second interior surface defined therein, said first interior surface and said second interior surface connected by at least one flexure, said first interior surface, said second interior surface and said configured to provide a pre-stress cavity for a high power actuator material, said at least one flexure configured to apply a pre-stress that varies by less than one part in a hundred as a temperature varies over 100 degrees Celsius to an actuator material inserted in said pre-stress cavity; and
   forming a horn portion connected to said monolithic pre-stress portion, said horn portion configured to be driven at a resonance frequency.

2. The method of manufacturing an ultrasonic horn for a high power actuator of claim 1, wherein the step of forming a monolithic pre-stress portion comprises forming said monolithic pre-stress portion using electron beam melting.

3. The method of manufacturing an ultrasonic horn for a high power actuator of claim 1, wherein the step of forming a monolithic pre-stress portion comprises forming said monolithic pre-stress portion using rapid prototyping.

4. The method of manufacturing an ultrasonic horn for a high power actuator of claim 1, wherein the step of forming a monolithic pre-stress portion comprises forming said monolithic pre-stress portion by precision machining.

5. The method of manufacturing an ultrasonic horn for a high power actuator of claim 1, wherein the step of forming a monolithic pre-stress portion comprises forming said monolithic pre-stress portion by electron discharge machining (EDM).

6. The method of manufacturing an ultrasonic horn for a high power actuator of claim 1, wherein the step of forming a monolithic pre-stress portion comprises forming said monolithic pre-stress portion by investment casting.

7. The method of manufacturing an ultrasonic horn for a high power actuator of claim 1, wherein the step of forming a monolithic pre-stress portion comprises forming said monolithic pre-stress portion by water-jetting.

8. The method of manufacturing an ultrasonic horn for a high power actuator of claim 1, further comprising the steps of:
- pulling said first interior surface and said second interior surface of said monolithic pre-stress portion apart;
- inserting a piezoelectric stack in said monolithic pre-stress portion; and
- releasing said monolithic pre-stress portion to apply said pre-stress to said piezoelectric stack.

9. The method of manufacturing an ultrasonic horn for a high power actuator of claim 8, wherein the step of pulling said first interior surface and said second interior surface of said monolithic pre-stress portion apart is performed using a bolt threadedly inserted into an end of said monolithic pre-stress portion.

10. The method of manufacturing an ultrasonic horn for a high power actuator of claim 8, wherein the step of pulling said first interior surface and said second interior surface of said monolithic pre-stress portion apart is performed using compression plates to hold a horn tip.

11. A method of manufacturing an ultrasonic horn for a high power actuator, comprising the steps of:
- forming a monolithic pre-stress portion constructed from a first material, said monolithic pre-stress portion having a first interior surface and a second interior surface defined therein, said first interior surface and said second interior surface connected by at least one flexure, said first interior surface and said second interior surface configured to provide a pre-stress cavity for a high power actuator material, said at least one flexure having a first stiffness value and said high power actuator material having a second stiffness value, said first stiffness value being at least a factor of 10 less than said second stiffness value; and
- forming a horn portion connected to said monolithic pre-stress portion, said horn portion configured to be driven at a resonance frequency.

12. The method of manufacturing an ultrasonic horn for a high power actuator of claim 11, wherein the step of forming a monolithic pre-stress portion comprises forming said monolithic pre-stress portion using electron beam melting.

13. The method of manufacturing an ultrasonic horn for a high power actuator of claim 11, wherein the step of forming a monolithic pre-stress portion comprises forming said monolithic pre-stress portion using rapid prototyping.

14. The method of manufacturing an ultrasonic horn for a high power actuator of claim 11, wherein the step of forming a monolithic pre-stress portion comprises forming said monolithic pre-stress portion by precision machining.

15. The method of manufacturing an ultrasonic horn for a high power actuator of claim 11, wherein the step of forming a monolithic pre-stress portion comprises forming said monolithic pre-stress portion by electron discharge machining (EDM).

16. The method of manufacturing an ultrasonic horn for a high power actuator of claim 11, wherein the step of forming a monolithic pre-stress portion comprises forming said monolithic pre-stress portion by investment casting.

17. The method of manufacturing an ultrasonic horn for a high power actuator of claim 11, wherein the step of forming a monolithic pre-stress portion comprises forming said monolithic pre-stress portion by water-jetting.

18. The method of manufacturing an ultrasonic horn for a high power actuator of claim 11, further comprising the steps of:
- pulling said first interior surface and said second interior surface of said monolithic pre-stress portion apart;
- inserting a piezoelectric stack in said monolithic pre-stress portion; and
- releasing said monolithic pre-stress portion to apply said pre-stress to said piezoelectric stack.

19. The method of manufacturing an ultrasonic horn for a high power actuator of claim 18, wherein the step of pulling said first interior surface and said second interior surface of said monolithic pre-stress portion apart is performed using a bolt threadedly inserted into an end of said monolithic pre-stress portion.

20. The method of manufacturing an ultrasonic horn for a high power actuator of claim 18, wherein the step of pulling said first interior surface and said second interior surface of said monolithic pre-stress portion apart is performed using compression plates to hold a horn tip.

* * * * *